US012566320B2

(12) United States Patent (10) Patent No.: US 12,566,320 B2
Oskotsky et al. (45) Date of Patent: Mar. 3, 2026

(54) PANORAMIC MWIR LENS FOR COOLED DETECTORS

(71) Applicant: BAE Systems Information and Electronic Systems Integration Inc., Nashua, NH (US)

(72) Inventors: Mark L. Oskotsky, Mamaroneck, NY (US); Michael J. Russo, Roslyn, NY (US); Daniel Engheben, Commack, NY (US); Jacinto E. Malabuyoc, Holbrook, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 356 days.

(21) Appl. No.: 18/333,898

(22) Filed: Jun. 13, 2023

(65) Prior Publication Data

US 2024/0418968 A1 Dec. 19, 2024

(51) Int. Cl.
| | |
|---|---|
| *G02B 13/06* | (2006.01) |
| *G02B 7/02* | (2021.01) |
| *G02B 9/64* | (2006.01) |
| *G02B 13/14* | (2006.01) |

(52) U.S. Cl.
CPC ............. *G02B 13/06* (2013.01); *G02B 7/028* (2013.01); *G02B 9/64* (2013.01); *G02B 13/14* (2013.01)

(58) Field of Classification Search
CPC .......... G02B 13/06; G02B 7/028; G02B 9/64; G02B 13/14; G02B 7/02; G02B 17/00; G02B 25/04; G02B 27/40; G02B 27/58; G02B 27/64; G02B 5/281

USPC .......................................... 430/369; 359/725
See application file for complete search history.

(56) References Cited

U.S. PATENT DOCUMENTS

| | | |
|---|---|---|
| 5,841,589 A | 11/1998 | Davis et al. |
| 6,426,774 B1 | 7/2002 | Driscoll et al. |
| 6,989,537 B2 | 1/2006 | Cook |
| 7,002,154 B2 | 2/2006 | Wellman et al. |

(Continued)

FOREIGN PATENT DOCUMENTS

| CN | 115356833 A | * | 11/2022 | ............. | G02B 13/06 |
|---|---|---|---|---|---|
| CN | 116125631 A | * | 5/2023 | ............. | G02B 13/00 |

(Continued)

OTHER PUBLICATIONS

Handbook of Optical Systems (Year: 2007).*

(Continued)

*Primary Examiner* — Thomas K Pham
*Assistant Examiner* — Kuei-Jen L Edenfield
(74) *Attorney, Agent, or Firm* — Sand, Sebolt & Wernow LPA; Gary McFaline

(57) ABSTRACT

A panoramic Mid-Wavelength Infrared (MWIR) lens has a plurality of optical elements, wherein each optical element from the plurality of elements is formed from a material that transmits in at least the MWIR band from 3 μm to 5 μm. The plurality of optical element are arranged in a manner that provides a 360 degree azimuth angle and an elevation angle that is within +/−20° from a 90° horizon. The panoramic MWIR lens is configured to be connected to a cooled Dewar, wherein the Dewar includes a cold shield and an image plane to detect light in the MWIR band transmitted through the plurality of optical elements.

22 Claims, 13 Drawing Sheets

(56)      References Cited

U.S. PATENT DOCUMENTS

| | | | |
|---|---|---|---|
| 7,042,656 | B2 | 5/2006 | Chen et al. |
| 7,672,045 | B2 | 3/2010 | Baker |
| 8,101,918 | B1 * | 1/2012 | Mercado ................ G02B 13/14 |
| | | | 359/357 |
| 8,294,988 | B2 * | 10/2012 | Cook ................ G02B 26/0883 |
| | | | 359/557 |
| 8,941,913 | B2 | 1/2015 | Kang et al. |
| 9,091,840 | B1 | 7/2015 | Vizgaitis |
| 9,110,276 | B2 | 8/2015 | Cook |
| 9,329,365 | B2 | 5/2016 | Mrozek et al. |
| 9,411,137 | B2 | 8/2016 | Cook |
| 10,317,650 | B1 | 6/2019 | Fry et al. |
| 11,187,879 | B2 | 11/2021 | Dang et al. |
| 11,199,686 | B2 | 12/2021 | Li et al. |
| 11,573,408 | B2 | 2/2023 | Hsu et al. |
| 2012/0057223 | A1 | 3/2012 | Cook |
| 2012/0162750 | A1 | 6/2012 | Vizgaitis |
| 2017/0322398 | A1 | 11/2017 | Yeh |
| 2020/0142160 | A1 | 5/2020 | Oskotsky et al. |
| 2022/0099946 | A1 | 3/2022 | Shimoeda |
| 2022/0276470 | A1 | 9/2022 | Tsai et al. |
| 2022/0352231 | A1 | 11/2022 | Oskotsky et al. |
| 2022/0390717 | A1 | 12/2022 | Choi et al. |
| 2022/0390720 | A1 | 12/2022 | Kim et al. |
| 2022/0390722 | A1 | 12/2022 | Syu |
| 2022/0413266 | A1 | 12/2022 | Arita et al. |
| 2023/0003980 | A1 | 1/2023 | Wang et al. |
| 2023/0050188 | A1 | 2/2023 | Zhang et al. |
| 2023/0066240 | A1 | 3/2023 | Reven et al. |

FOREIGN PATENT DOCUMENTS

| | | | |
|---|---|---|---|
| EP | 1533638 | B1 | 6/2008 |
| EP | 4036626 | A1 | 8/2022 |
| EP | 4148478 | A1 | 3/2023 |
| GB | 2434878 | A | 8/2007 |
| GB | 2578679 | A | 5/2020 |
| WO | 2021/163071 | A1 | 8/2021 |
| WO | 2022271546 | A1 | 12/2022 |

OTHER PUBLICATIONS

English translation of CN115356833 (Year: Nov. 18, 2022).*
English translation of CN116125631 (Year: May 16, 2023).*
International Search Report, PCT/US24/33208, mailed Sep. 11, 2024, 7 pages.
Introduction to Panoramic Lenses, by Claudio Pernechele, pp. 1-9, 18-24, 38-44, epub ISBN: 9781510619906, Published by SPIE Press, P.O. Box 10, Bellingham, Washington 98227-0010 USA, 2018, for the Society of Photo-Optical Instrumentation Engineers (SPIE).
Optical Design of a Panoramic, Wide Spectral Band, Infrared Fisheye Lens, pp. 1-6,by Harvey M. Spencer et al, date unknown.
Catadioptric Omnidirectional Optical System Using a Spherical Mirror With a Central Hole and a Plane Mirror for Visible Light, by Hyeon Jin Seo et al, in the Korean Journal of Optics and Photonics, vol. 26, No. 2, Apr. 2015, pp. 88-97.
Modeling and Analysis of a High-Performance Midwave Infrared Panoramic Periscope by Jonathan Nichols et al, Nov. 2010, pp. 1-3.
Hybrid Lens Design for Ultrawide-Angle Imaging With a High Strehl Ratio in a Folded System, by Yu-Shan Chang et al, pp. 1-4, Jul. 2018.

* cited by examiner

Panoramic lens optical prescription

| | Radius | Thickness | Glass |
|---|---|---|---|
| OBJECT: | INFINITY | INFINITY | |
| 1: | 0 | 0 | |
| 2: | 92.33456 | 15.000000 | GERMANIUM |
| 3: | 56.54869 | 60.000000 | |
| 4: | 314.88060 | 10.000000 | SILICON |
| 5: | 96.11789 | 24.363953 | |
| 6: | 142.49881 | 20.000000 | GERMANIUM |
| 7: | 312.02202 | 15.000000 | |
| 8: | -402.94912 | 10.000000 | SILICON |
| 9: | 314.42611 | 14.037478 | |
| 10: | 981.36631 | 15.000000 | SILICON |
| 11: | 194.47575 | 0.100000 | |
| 12: | 198.36760 | 20.000000 | SILICON |
| 13: | -295.22009 | 19.557714 | |
| 14: | -111.06949 | 8.000000 | GERMANIUM |
| 15: | -774.47812 | 0.417249 | |
| 16: | 419.70046 | 10.000000 | SILICON |
| 17: | -107.41842 | 2.372921 | |
| 18: | -102.96433 | 8.000000 | GERMANIUM |
| 19: | -104.03719 | 0.100000 | |
| 20: | INFINITY | 2.500000 | GERMMW_SPECIAL |
| 21: | INFINITY | 2.500000 | |
| STOP: | INFINITY | 0.000000 | |
| 23: | INFINITY | 3.000000 | GERMMW_SPECIAL |
| 24: | INFINITY | 149.400006 | |
| IMAGE: | INFINITY | 0.000000 | |

FIG.4A

Aspheric surfaces and equations coefficients:

| | | | | |
|---|---|---|---|---|
| S2 | A: 0.411998E-06 | B: -0.986237E-10 | C: 0.921837E-14 | D: -0.331214E-18 |
| S5 | A: -0.508482E-07 | B: -0.797513E-10 | C: 0.109023E-12 | D: -0.249762E-16 |
| S7 | A: -0.854962E-06 | B: 0.263021E-09 | C: -0.437695E-13 | D: 0.340202E-17 |
| S9 | A: 0.328392E-05 | B: 0.276327E-09 | C: -0.147259E-11 | D: 0.557851E-15 |
| S11 | A: 0.142320E-06 | B: -0.158492E-09 | C: 0.992288E-13 | D: -0.231050E-16 |
| S14 | A: -0.507366E-06 | B: 0.141793E-08 | C: -0.100417E-11 | D: 0.327448E-15 |
| S17 | A: -0.136132E-06 | B: 0.115976E-08 | C: -0.117266E-11 | D: 0.374521E-15 |
| S19 | A: 0.178693E-06 | B: -0.188136E-09 | C: 0.385039E-12 | D: -0.111632E-15 |

Refractive Indices:

| WAVELENGTH | 5000.00 | 4100.00 | 3300.00 |
|---|---|---|---|
| GERMANIUM MWIR | 4.015388 | 4.023369 | 4.036818 |
| SILICON MWIR | 3.422272 | 3.424982 | 3.429572 |

Infinite Conjugates:

| | |
|---|---|
| EFL | 30.5046 |
| BFL | 150.5600 |
| FFL | 149.9794 |
| FNO | 3.3000 |
| IMG DIS | 149.4000 |
| OAL | 359.9493 |

Paraxial Image:

| | |
|---|---|
| HT | 0.0000 |
| ANG | 0.0000 |

Entrance Pupil:

| | |
|---|---|
| DIA | 9.2438 |
| THI | 156.1294 |

FIG.4B

Exit Pupil:

| | |
|---|---|
| DIA | 45.8502 |
| THI | -0.7456 |

The form of asphere surfaces is as follows:

$$z = \frac{cr^2}{1 + \sqrt{1 - (1+k)\,c^2 r^2}} + Ar^4 + Br^6 + Cr^8 + Dr^{10} + Er^{12} + Fr^{14} + Gr^{16} + Hr^{18} + Jr^{20}$$

Where:

$z$    is the sag of the surface parallel to the z-axis $c$    is the curvature at the pole of the surface (CUY)

$k$    is the conic constant (K) and $k = 0$     - sphere $-1 < k < 0$     - ellipsoid with major axis on the optical axis (prolate spheroid)

$k = -1$     - paraboloid $k < -1$     - hyperboloid

Also, $k = -e^2$, where e is eccentricity

For $k > 0$     - oblate spheroid (not a conic section) the surface is generated by rotating an ellipse about its minor axis and $$k = e^2 / (1 - e^2)$$

where e is the eccentricity of the generating ellipse $A, B, C, D, E, F, G, H, J$    are the 4th, 6th, 8th, 10th, 12th, 14th, 16th, 18th, 20th order deformation coefficients, respectively $(A = B = C = D = E = F = G = H = J = 0$ yields a pure conic surface)

$r$    is the radial distance $= \sqrt{x^2 + y^2}$

FIG.4C

| Material | Refractive Index | | dn/dT (K$^{-1}$) | Spectral Range |
|---|---|---|---|---|
| | l=4µm | l=10µm | | |
| Germanium | 4.0243 | 4.0032 | .000396 | 2.0 - 17.0µm |
| Gallium Arsenide | 3.3069 | 3.2778 | .000148 | 0.9 - 16.0µm |
| ZnSe | 2.4331 | 2.4065 | .000060 | 0.55 - 20.0µm |
| ZnS (cleartran) | 2.2523 | 2.2008 | .000054 | 0.37 - 14.0µm |
| AMTIR-1 | 2.5141 | 2.4976 | .000072 | 0.7 - 14.0µm |
| AMTIR-3 | 2.6200 | 2.6002 | .000091 | 1.0 - 14.0µm |
| AMTIR-4 | 2.6487 | 2.6353 | -.000030 | 1.0 - 14.0µm |
| GASIR1 | 2.5100 | 2.4944 | .000055 | 1.0 - 14.0µm |
| GASIR2 | 2.6038 | 2.5841 | .000058 | 1.0 - 14.0µm |
| Silicon | 3.4255 | N/A | .000160 | 1.2 - 9.0µm |
| Sapphire | 1.6753 | N/A | .000013 | 0.17 - 5.5µm |
| BaF$_2$ | 1.4580 | 1.4014 | -.000015 | 0.15 - 12.5µm |
| CaF$_2$ | 1.4097 | 1.3002 | -.000011 | 0.13 - 10.0µm |
| As$_2$S$_3$ | 2.4112 | 2.3816 | -.0000086 | 0.65 - 8.0µm |
| MgO | 1.6679 | N/A | .000011 | 0.4 - 8.0µm |

FIG.7

PANORAMIC MWIR LENS FOR COOLED DETECTORS

TECHNICAL FIELD

The present disclosure relates generally to panoramic mid-wave infrared lenses.

BACKGROUND ART

Airborne platforms for Intelligence, Surveillance, and Reconnaissance (ISR) use efficient Situational Awareness (SA) day/night sensor to dramatically expand Near-Real-Time (NRT) processing of wide-area, high-resolution video imagery for target recognition and tracking. Current approaches utilize multiple apertures or sensors with limited fields of view at the expense of size, weight and power (SWaP). The inclusion of multiple sensors decreases product reliability (higher part counts) and adds both development and support logistics costs.

There are few classes of panoramic lenses. The first class, a standard perspective lens, pans and tilts to capture a number of perspective shots of the scene. The multiple images are then stitched to create a panoramic view. One disadvantages of the pan-tilt camera is that it requires a significant amount of time to form the panoramic image. It has to pause to capture the individual images used to compose the panoramic image. Also, a moving camera cannot provide simultaneous vision of the surrounding environment, and dynamic information is lost. For this reason, the system is useful for static scenery (panoramic photography, art diagnostics, architecture, etc.).

The second class, panoramic sensors with multiple lenses, offer simultaneous vision of the panoramic space and have satisfactory spatial resolution. However that comes at the expense of size, weight power and cost (SWaP-C), and usually require a complicated calibration.

Omnidirectional (single lens with panoramic vision) lens belong to the third class. A motionless panoramic lens has many advantages with respect to the other classes: it uses only one detector (unlike the second class of lenses) and does not need a moving motor (as in the first class of lenses). All of these aspects result in lower SWAP-C. Furthermore, the reduced number of parts and complexity minimizes potential failure mechanisms. All of these benefits make the omnidirectional panoramic lens the preferred solution for both ground and airborne ISR platforms.

Lenses operating in the infrared portion of the electromagnetic spectrum have long been used to extend the useful range of operating conditions from those of more conventional sensor systems operating in the visual spectral band. Lenses operating in the 3 to 5 micrometer or micron Mid-Wavelength Infrared (MWIR) band detect the heat emissions of objects and are therefore able to image in conditions of visual darkness or through obscurants such as dust and smoke. A panoramic MWIR lens is a type of lens used in infrared imaging systems. It is designed to capture a wide field of view and provide high-resolution images in the mid-wave infrared spectrum.

ISR applications typically require an infrared lens to be mounted on airborne platform such that optical axis looks straight up for extremely wide-angle autonomous surveillance. Usually the field of view (FOV) to be covered extends in elevation to 30 degrees (10 degrees above horizon and 20 degrees below horizon) and covering a full 360 degrees in the azimuth direction. This coverage is to be imaged in the fisheye sense onto a multi-pixel staring detector array providing output with the panoramic FOV of interest mapped on the detector.

There are different configurations of panoramic lens designs. Reflective (Catoptric) designs or lenses utilize only reflective surfaces; this approach leads to an on-axis obscuration and large mirror elements. It is impractical to incorporate Dewar into such lenses. There are also catadioptric designs. All disadvantages of the reflective designs apply to this category of lenses, besides chromatic aberration is not corrected well to produce achromatic imaging. The cost of refractive components is proportional to their diameter and having large optical elements must be avoided. In this design type a complex multi-element refractive group is required to correct the large aberrations generated by the highly curved mirrors. There are also, refractive designs. These lenses do not have on-axis obscuration and allow reduced size of the optics while incorporating a single high resolution cooled detector.

Some exemplary features of a panoramic MWIR lens include: (1) Wide Field of View: The panoramic MWIR lens is designed to capture a wide field of view, allowing the infrared imaging system to cover a larger area. (2) High Resolution: The lens is designed to provide high-resolution images, ensuring that details are captured with clarity and accuracy. (3) Mid-Wave Infrared Spectrum: The lens is optimized for the mid-wave infrared spectrum, which is the range of wavelengths between 3 and 5 microns. This range is useful for detecting temperature differences, as well as for identifying certain materials and substances. (4) Multispectral Capabilities: Some panoramic MWIR lenses are designed to work in conjunction with other lenses, providing multispectral capabilities. This allows the imaging system to capture images in different wavelengths, providing a more complete picture of the area being monitored. (5) Compact Design: The lens is designed to be compact and lightweight, making it easy to integrate into an infrared imaging system. (6) High-Quality Materials: The lens is made from high-quality materials, such as germanium, which are optimized for use in the mid-wave infrared spectrum. (7) Temperature Stability: The lens is designed to remain stable over a wide range of temperatures, ensuring that it provides consistent performance in different environmental conditions.

Incorporating a panoramic MWIR lens in a cooled detector or imager is challenging due to several factors. For example, there may be size and weight constrains because a panoramic MWIR lens designed for wide field-of-view applications can be quite large and heavy. This can pose a challenge when integrating it into a cooled detector or imager, which also needs to be compact and lightweight. There may also be difficulties with cooling requirements because cooled detectors and imagers require a low-temperature environment to operate effectively. The cooling system needs to be able to dissipate the heat generated by the detector or imager while maintaining a stable temperature. Incorporating a large panoramic MWIR lens can complicate the cooling system design. There may also be difficulties with ensuring proper alignment because proper alignment between the panoramic MWIR lens and the detector or imager is critical for achieving high-quality images. However, due to the size and weight of the lens, it can be difficult to maintain alignment over time, especially when the system is subjected to vibration and other environmental factors. There are also cost concerns because a panoramic MWIR lens can be expensive due to its complex design and the high-quality materials used in its construction. Incorporating such a lens into a cooled detector or imager can significantly increase the cost of the overall system. Further, it may be difficult to achieve optimal performance because the performance of a panoramic MWIR lens can be affected by a variety of factors, such as temperature fluctuations, vibration, and misalignment. Achieving optimal performance in a cooled detector or imager requires careful attention to these factors, which can be challenging to manage.

SUMMARY OF THE INVENTION

Incorporating a panoramic MWIR lens into a cooled detector or imager can be difficult due to these several factors, including size, weight, cooling requirements, alignment, cost, and optimal performance. The present disclosure addresses these and other issues by providing a panoramic MWIR lens for cooled detectors or imagers. The use of a single 360° imager that can image the full horizon (azimuth) and support greater than 30 degrees of elevation allow for a compact single sensor solution. On-board processing to unwrap the 360° image can be accomplished in NRT by utilizing an integrated electronics suite prior to the detection, identification and recognition for targets of interest.

In one aspect, an exemplary embodiment of the present disclosure may provide a panoramic MWIR lens for use with a 6-inch long cooled detector operating at 100% cold shield efficiency. The panoramic lens is corrected for both monochromatic and chromatic aberrations over the wavelength range 3300 nm-5000 nm (about 3 μm-5 μm) and works at an f-number of 3.3 or less. The 30 mm paraxial focal length lens forms a 48 mm×48 mm high resolution image on a 8 μm pixel pitch CCD or CMOS focal plane. This image format corresponds to a 360 degree azimuth angle and a large 40 degree elevation angle. In one exemplary embodiment, the MWIR lens includes at least nine optical power elements and only requires two types of optical MWIR materials, Germanium and Silicon. The first and seventh optical elements are Germanium with a negative optical power; the second, fourth, fifth and ninth optical elements are Silicon with a negative optical power; the third optical element is Germanium with a positive optical power; and the sixth and eighth optical elements are Silicon with a positive optical power. The powers of the optical elements, their shapes, refractive indices and dispersions of materials are arranged such that the lens features a full 360 degree azimuth angle and an extremely large 40 degree elevation angle while providing good quality imagery for use with a high resolution 8 μm pixel pitch CCD or CMOS focal plane. The lens and cooled detector combination establish an efficient SA day/night sensor to dramatically expand NRT processing of wide-area, high-resolution video imagery for target recognition and tracking.

In one exemplary embodiment, a panoramic MWIR lens that utilizes only Germanium and Silicon optical elements has some advantages. Both of these materials are readily available, reasonably inexpensive, and have high refractive indices which make aberration correction easier than lower index materials which require extreme surface curvatures. These higher index materials are especially useful in the design of panoramic lenses where high surfaces curvatures are needed to direct rays from behind the lens around the corner and through the system to the focal plane.

In another aspect, an exemplary embodiment of the present disclosure may provide a panoramic MWIR lens comprising: a plurality of optical elements, wherein each optical element from the plurality of elements is formed from a material that transmits in at least the MWIR band from 3 μm to 5 μm; wherein the plurality of optical element are arranged in a manner that provides a 360 degree azimuth angle and an elevation angle that is within +/−20° from a 90° horizon; wherein the panoramic MWIR lens is configured to be connected to a cooled Dewar, wherein the Dewar includes a cold shield and an image plane to detect light in the MWIR band transmitted through the plurality of optical elements.

BRIEF DESCRIPTION OF THE DRAWINGS

Sample embodiments of the present disclosure are set forth in the following description, are shown in the drawings and are particularly and distinctly pointed out and set forth in the appended claims.

FIG. 4A, FIG. 4B and FIG. 4C collectively depict a table listing properties of optical elements for one exemplary embodiment according to the present disclosure.

FIG. 7 is a table of common IR optical materials properties.

Similar numbers refer to similar parts throughout the drawings.

DETAILED DESCRIPTION

Figure 1:
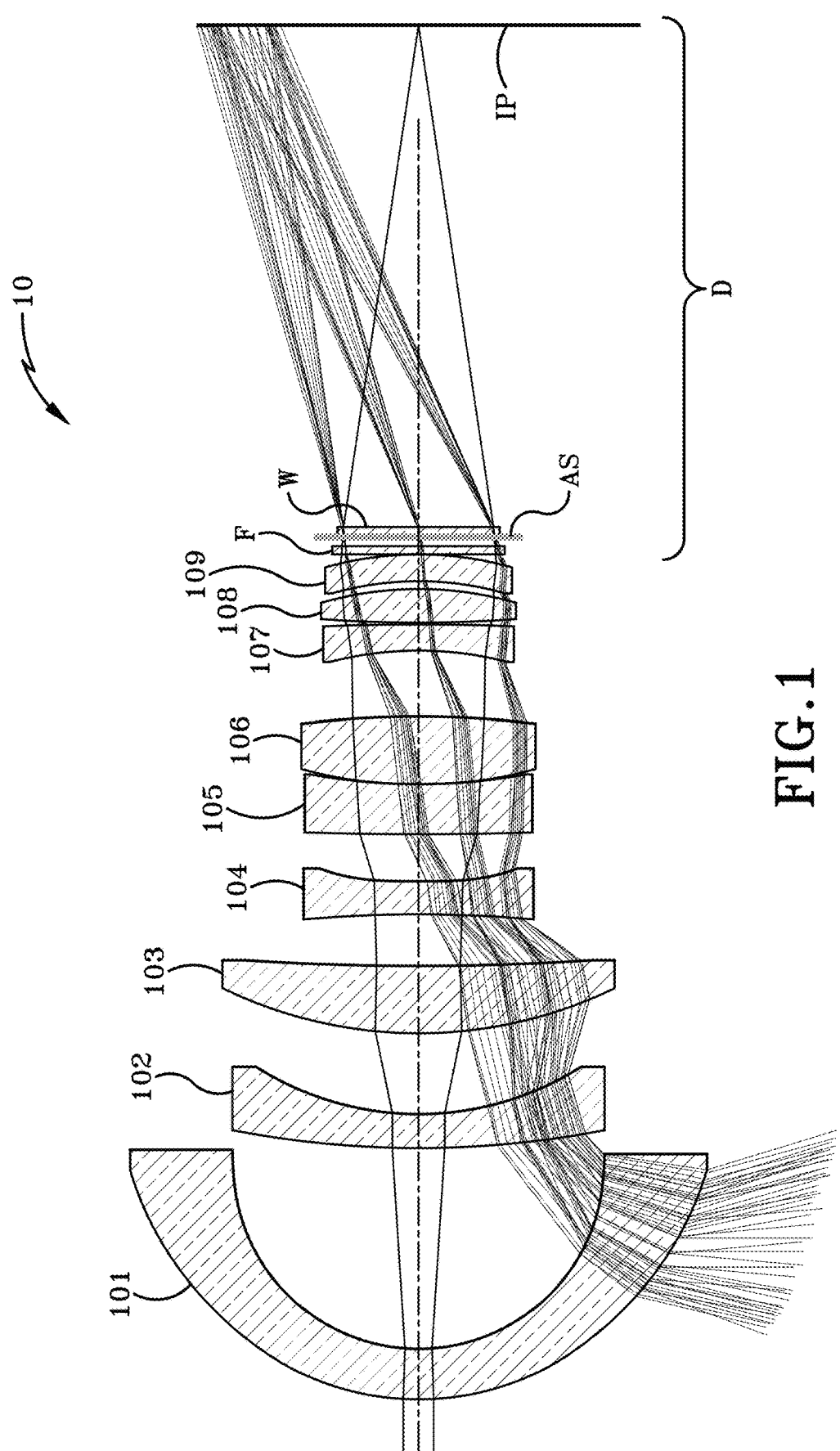
FIG. 1 depicts an optical layout for an exemplary lens according to one embodiment of the present disclosure.
Figure 2:
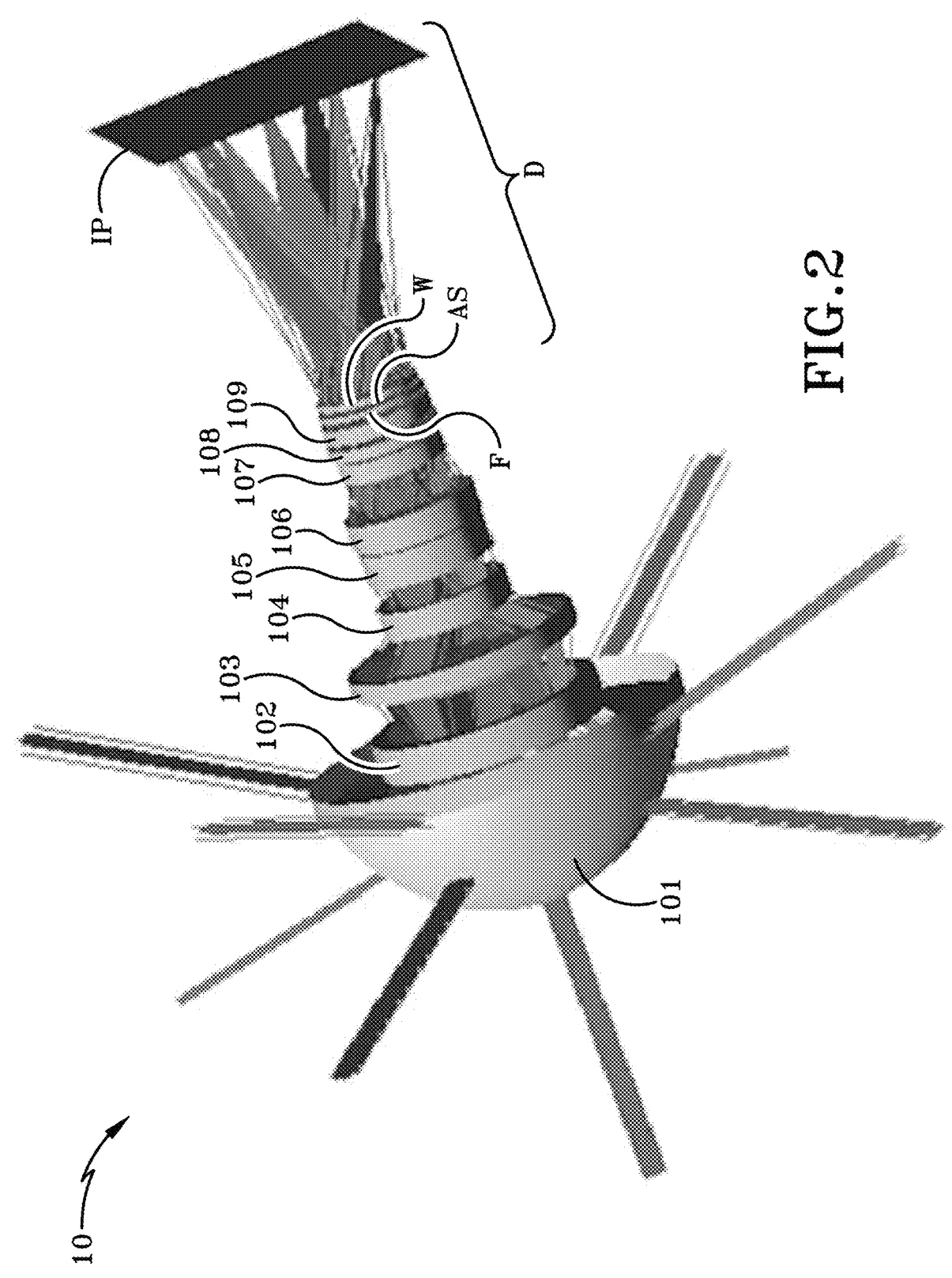
FIG. 2 depicts a 3D layout of the lens according to one embodiment of the present disclosure.

FIG. 1 and FIG. 2 depict an exemplary embodiment of a panoramic Mid-Wavelength Infrared (MWIR) lens 10 for a cooled detector according to one aspect of the present disclosure. In one embodiment, the lens 10 includes a plurality of optical elements that are arranged optically front-to-back, wherein the front surface of a respective optical element faces the object, landscape or scenery to be imaged and the back surface of the optical element faces an image plane or detector. In one particular embodiment, the plurality of optical elements includes, in front-to-back order, a first optical element 101, a second optical element 102, a third optical element 103, a fourth optical element 104, a fifth optical element 105, a sixth optical element 106, a seventh optical element 107, an eighth optical element 108, and a ninth optical element 109. There may also be a spectral filter F, a cold shield which is a hard aperture stop (AS) or a cold shield AS, a Dewar window W, an image plane IP (i.e., a focal plane array (FPA)) which may collectively define a cooled 12k² detector of an Integrated Dewar Electronics Cooler Assembly (IDECA) that operates with lens 10 to form an optical assembly or optical system. The cold shield AS and the Dewar window W are inside a Dewar D, which may have a length of 152.4 mm or another length depending on application specific needs of lens 10.

One exemplary set of specifications for the lens 10 are: (1) F/3.3 matched to CFE 12k² IDECA Detector or matched to the selected image plane IP; (2) Paraxial EFL=32.5 mm; (3) Overall length (OAL)=360 mm; (4) at least 9 Elements 101-109 with 9 aspheric surfaces; (5) all Germanium or Silicon elements 101-109; (6) 360° Azimuth FOV; and/or (7) 40° Elevation FOV (set at +/−20° from horizon, wherein the horizon is nominally oriented at) 90°. While these specifications are shown, other specifications may be chosen depending on the application specific needs of the optical system utilizing lens 10.

In one embodiment, the first optical element 101 may have a negative optical power and is configured to receive light at the 360 degrees azimuth angles and 40 degrees elevation angles of +/−20 degrees above and below the horizon, from a remote object, and to direct the diverged light onto the second optical element 102. The first element 101 may be made in a form of a negative meniscus whose convex surface faces toward the object. The convex surface is formed aspherical in order to correct for the high order spherical aberration and high order distortion across the field. In one exemplary embodiment, the material that forms element 101 is Germanium. Additionally, the rear concave surface of the first optical element can be formed aspherical for spherical aberration and coma correction.

The second optical element 102 may have a negative optical power and is configured to further diverge the light received from the first optical element 101 and to direct the diverged light onto the third optical element 103. The second optical element 102 element may be made in a form of a negative meniscus with a convex surface faces toward the object. The rear concave surface is formed aspherical in order to correct for the high order coma and tangential astigmatism across the field. In one exemplary embodiment, the material that forms element 102 is Silicon.

The third optical element 103 may have a positive optical power and is configured to converge the light received from the second optical element 102 and to direct the converged light onto the fourth optical element 104. The third optical element 103 may be made in a form of a positive meniscus with a convex surface faces toward the object. The rear concave surface is formed aspherical in order to correct for the wide field spherical aberration and sagittal astigmatism. In one exemplary embodiment, the material that forms element 103 is Germanium.

The fourth optical element 104 may have a negative optical power and is configured to diverge the light received from the third optical element 103 and to direct the diverged light onto the fifth optical element 105. The fourth optical element 104 may be made in a form of double concave lens, namely a first concave surface facing toward the object and a second concave surface facing toward the image plane IP. Both concave surfaces may be aspherical. The second concave surface facing away from the object and toward the image plane is formed aspherical in order to correct for high order coma. In one exemplary embodiment, the material that forms element 104 may be either one of Silicon or Germanium.

The fifth optical element 105 may have a negative optical power and is configured to further diverge the light received from the fourth optical element 104 and to direct the diverged light onto the sixth optical element 16. The fifth optical element 105 may be made in a form of a negative meniscus where the concave surface facing away from the object and toward the image plane is formed aspherical in order to correct for the low order distortion and astigmatism. In one exemplary embodiment, the material that forms element 105 is Silicon.

The sixth optical element 106 may have a positive optical power and is configured to converge the light received from the fifth optical element 105 and to direct the converged light onto the seventh optical element 107. The sixth optical element 106 may be made in a form of a double convex lens where the first convex surface facing toward the object is formed aspherical in order to correct for the high order coma. The second convex surface faces the image plane or away from the object. In one exemplary embodiment, the material that forms element 106 is Silicon.

The seventh optical element 107 may have a negative optical power and is configured to diverge the light received from the sixth optical element 106 and to direct the diverged light onto the eighth optical element 108. The seventh optical element 107 may be made in a form of a negative meniscus where the concave surface facing toward the object is formed aspherical in order to correct for the residual high order field curvature and low order distortion. In one exemplary embodiment, the material that forms element 107 is Germanium.

The eighth optical element 108 may have a positive optical power and is configured to converge the light received from the seventh optical element 107 and to direct the converged light onto the ninth optical element 109. The eighth optical element 108 may be made in a form of double convex lens where the convex surface facing toward the image is formed aspherical in order to correct for the Petzval field curvature residual astigmatism. In one exemplary embodiment, the material that forms element 108 is Silicon.

The ninth optical element 109 may have a positive optical power and is configured to converge the light received from the eight optical element 108 and to direct the converged light through the spectral filter F, and then through the aperture stop AS which is the cold shield and Dewar window W, and onto the image plane IP which may be a high resolution charged coupled device (CCD) or Complementary Metal Oxide Semiconductor (CMOS. In one particular embodiment, the image plane IP is located in the cooled Dewar D. The ninth optical element 109 may be made in a form of positive meniscus where the convex surface facing away from the object and is formed aspherical in order to correct for residual distortion and astigmatism. In one exemplary embodiment, the material that forms element 109 is Germanium.

In one embodiment, the aperture stop/cold shield AS is 100% efficient providing elimination of the stray light going to the image plane. However the aperture stop AS may be near 100% but not totally. The lateral high order chromatic aberration may be compensated by the mutual combination of the first, second and third optical elements, where first optical element 101 acts as a flint material, second optical element 102 acts a crown material and third optical element 103 compensates residual lateral chromatic aberration induced by the first and second elements 101, 102. The low order chromatic aberration may be compensated by the mutual combination of optical powers and materials dispersions of the fourth, fifth and sixth optical elements 104, 105, and 106. The secondary color is compensated by the contributions of the optical powers and materials of the seventh, eighth and ninth elements 107, 108, 109.

The following relations, ratios, and/or proportions among the optical elements 101, 102, 103, 104, 105, 106, 107, 108 and 109, among their shapes and their materials' properties have been found to achieve monochromatic and chromatic aberrational correction for the field of view of 360 degrees azimuth and 40 degrees elevation angels while incorporating the cold shield AS and Dewar D with a cooled high resolution image plane IP into the MWIR lens 10 optical configuration.

$$-0.48 < F'_{10} / F'_{101} < -0.36$$

$$-0.65 < F'_{10} / F'_{102} < -0.40$$

$$0.30 < F'_{10} / F'_{103} < 0.45$$

$$-0.48 < F'_{10} / F'_{104} < -0.35$$

$$-0.40 < F'_{10} / F'_{105} < -0.25$$

$$0.50 < F'_{10} / F'_{106} < 0.66$$

$$-0.76 < F'_{10} / F'_{107} < -0.65$$

$$0.75 < F'_{10} / F'_{108} < 0.90$$

$$0.03 < F'_{10} / F'_{109} < 0.05$$

$$1.05 < n_{101}/n_{102} = n_{101}/n_{104} = n_{101}/n_{105} = n_{101}/n_{106} = n_{101}/n_{108} < 1.25$$

$$0.95 < n_{101}/n_{103} = n_{101}/n_{107} = n_{101}/n_{109} < 1.05$$

$$0.35 < V_{101}/V_{102} = V_{101}/V_{104} = V_{101}/V_{105} = V_{101}/V_{106} = V_{101}/V_{108} < 0.50$$

$$0.90 < V_{101}/V_{103} = V_{101}/V_{107} = V_{101}/V_{109} < 1.10$$

$$2.55 < OAL/DL < 2.85$$

Wherein:

$F'_{10}$ is the focal length of the lens 10;

$F'_{101}$, $F'_{102}$, $F'_{103}$, $F'_{104}$, $F'_{105}$, $F'_{106}$ $F'_{107}$, $F'_{108}$ and $F'_{109}$ are the focal lengths of the first, second, third, fourth, fifth, sixth, seventh, eighth and ninth optical elements, respectively;

$n_{101}$, $n_{102}$, $n_{103}$, $n_{104}$, $n_{105}$, $n_{106}$, $n_{107}$, $n_{108}$, $n_{109}$ are the refractive indices of the materials of the first, second, third, fourth, fifth, sixth, seventh, eighth and ninth optical elements, respectively;

$V_{101}$, $V_{102}$, $V_{103}$, $V_{104}$, $V_{105}$, $V_{106}$, $V_{107}$, $V_{108}$. $V_{109}$ are the Abbe numbers of the first, second, third, fourth, fifth, sixth, seventh, eighth and ninth optical elements, respectively;

OAL is the overall length of the lens 10; and

DL is the length of the cooled Dewar D.

The combination of optical elements 101-109, optical powers and their shapes, optical elements material refractive indices and dispersions combinations allow monochromatic and chromatic aberrational correction while incorporating of the cooled Dewar D with a high resolution image plane IP into the lens 10 configuration. Lens 10 provides a 360 degrees azimuth field of view and 40 degrees elevation field of view: +/−20 degrees below and above the elevation plane. Lens 10 features a low F-Number below 4, such as a F-number of 3.3 or less.

Figure 3A:
FIG. 3A and FIG. 3B depict a modulation transfer function at half-Nyquist data at the identified angles for the lens according to the present disclosure.
Figure 3A:
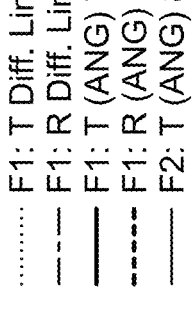
Figure 3A:
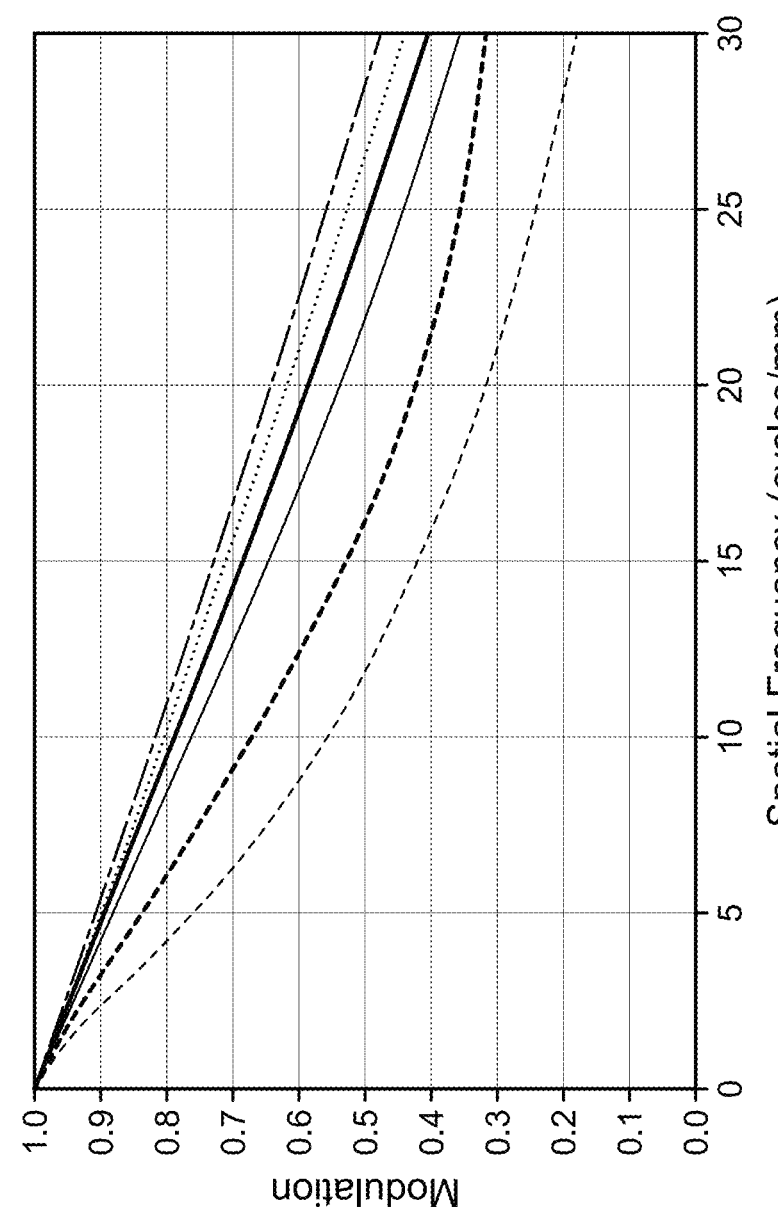
Figure 3B:
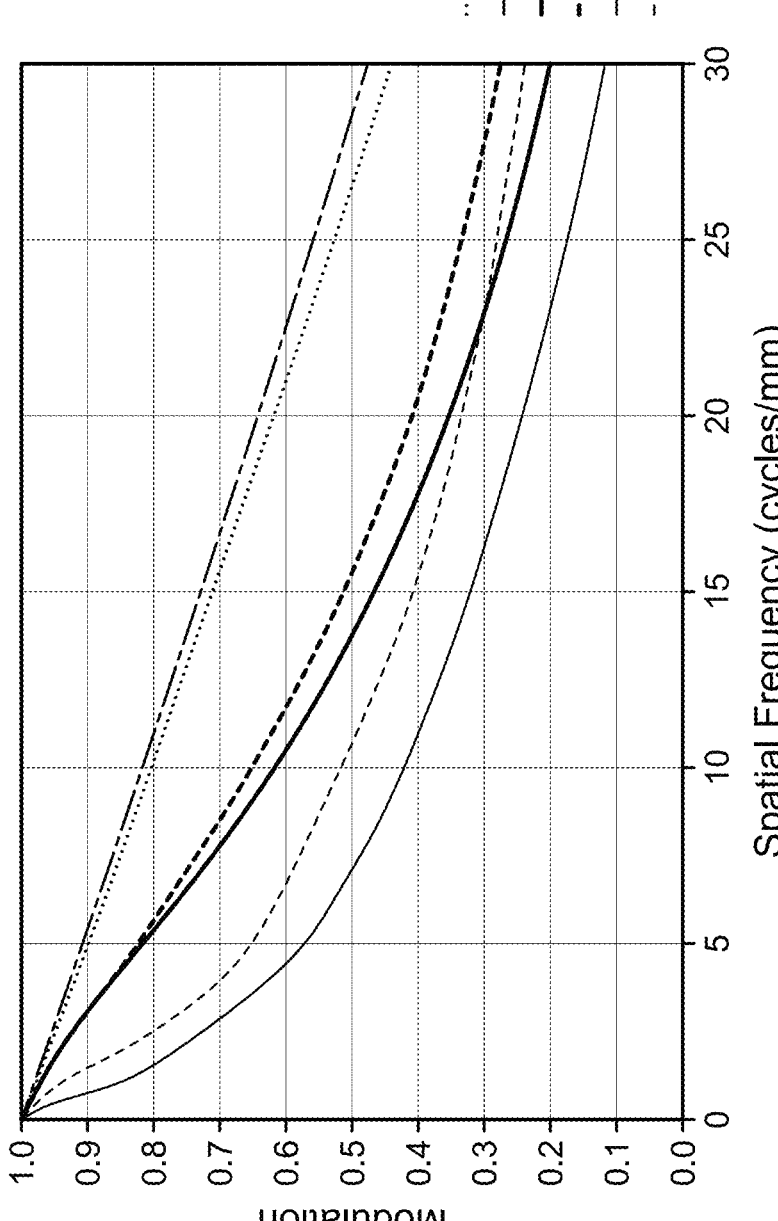
Figure 3B:

FIG. 3A and FIG. 3B are graphs of multiple exemplary diffraction modulation transfer functions (MTF) at half-Nyquist data at the identified angles for an exemplary 360 degree imager with the modulation represented on the Y-axis and spatial frequency (cycles/mm) on the X-axis. Diffraction MTF is a wave-optics calculation that identifies the upper limit to the system's performance. The diffraction MTF is based on the overall limiting aperture of the system (the aperture stop). The graphed lines represent the upper limits of the systems performance based on the 40 degrees elevation field of view: +/−20 degrees below and above the elevation plane 90° (i.e., from 70° to) 110°.

FIG. 3A and FIG. 3B depict MTF curves for a number of different fields. For example, in FIG. 3A there is shown a curve for a first field F1 at a Tangential Plane (T) for the diffraction limit, wherein the tangential plane T is the X-Y plane. There is also shown a curve for a first field F1 at a Sagittal or Radial plane (R) for the diffraction planes, wherein the sagittal or radial plane R is the X-Z plane. The diffraction limit corresponds to optics with no aberrations. Further, since lens 10 is shown to operate +/−20° from the horizon 90°, the Diffraction MTF for the fields for the T and R planes corresponding to 70°, 80°, 95°, and 110° angles are shown as intermediate exemplary data. The lines in the graph of FIG. 3A and FIG. 3B depict the ratio of the image and object contrasts and the sharpness/resolution of the image at the detector.

FIG. 4A identifies prescriptions of the Panoramic MWIR lens 10 for cooled detectors along with properties of the optical elements 101-109. For example, FIG. 4A details the panoramic MWIR lens 10 with different radiuses, thicknesses, and material (e.g., "glass") properties for a number of exemplary objects.

FIG. 4B details aspheric surfaces and equation coefficients identified in FIG. 4C. FIG. 4B further details the refractive indices for Germanium and Silicon. FIG. 4B further details the infinite conjugates, the paraxial image, the entrance pupil dimensions (diameter and thickness), and the exit pupil dimensions (diameter and thickness).

FIG. 4C details the equation utilized to calculate the sag of the surface parallel to the z-axis. In one example, the data from the aspheric surface and equation coefficients of FIG. 4B are utilized in the equation detailed in FIG. 4C.

An optical sensor that incorporates, utilizes, or includes lens 10, and the optical sensor operating in the infrared portion of the electromagnetic spectrum are used to extend the useful range of operating conditions from those of more conventional sensor systems operating in the visual spectral band. Sensors operating in the 3 to 5 micron (μm) MWIR band detect the heat emissions of objects rather than reflected visible light and are therefore able to image in conditions of visual darkness or through obscurants such as dust and smoke.

Typically, a field of view or field of views (FOVs) for sensors operating in the MWIR band range from very narrow sub-degree fOVs, which are useful for high resolution detection of small targets at extended ranges, to the 40 or 50 degrees commonly used for wider angle surveillance applications. The wider FOVs have increasingly been used in sensors mounted on the airborne platforms for intelligence, reconnaissance and surveillance (ISR).

Panoramic lenses provide the FOV to cover a full 360 degrees in the azimuth direction and 30-40 degrees in elevation direction—for example 20 degrees below the horizon (azimuth plane) and 20 degrees above the horizon.

This coverage is imaged onto a multi-pixel staring detector array providing output video, with the panoramic FOV of interest mapped into an annular image on the detector. Image processing or image logic determines the location of the object of interest by a calibration that associates each detector pixel with a specific angular swath in the space to be monitored or being monitored. As such, geometrical distortion does not directly limit system performance. However, the optical performance, specifically MTF, must be held with a good resolution (usually determined by Nyquist resolution) below a few pixel areas in size so as not to create excessive uncertainty in the angular location of the target.

MWIR optical systems incorporating cooled detectors are needed to obtain sharp images with background noise eliminated (for example stray emission). Typically, reduction of SWAP-C of the optical sensor is a desirable attribute of the optical system mounted on ground and airborne platforms, regardless of whether the platform is manned or unmanned. The combination of low f/number and the large FOV, coupled with MWIR spectral band presents a challenging optical design. Most of the panoramic lenses are Catoptric or Catadioptric and employ reflective surfaces. This results in a Dewar D with high resolution cooled detectors and 100% efficient cold shield cannot be easily implemented in these designs because size of the optical reflective surfaces becomes unrealistic for the fabrication and alignment.

The panoramic feature of lens 10 is different from the fish-eye lens in that the FOV of lens 10 is centered about a plane orthogonal to the optical axis. Furthermore, according to the embodiments of the present disclosure preference may generally be given for imaging a FOV that is roughly equal on either side of this plane. For example, a FOV measuring 360°×40° would mean that the lens has to function over an equivalent field angle range of 90°+/−20° (i.e., from +70° to +110° relative to the horizon at) 90°. Where pupil imagery is reasonably good to a first-order approximation, an optical sensor can expect mapping of the object space onto the image format to be based on an f-theta relationship rather than the usual f-tan (theta) one.

The lens 10 of the present disclosure should reach the required distortion profile with a good the lateral color correction. The Seidel Third-order aberration contribution to distortion varies as the cube of the object height, which means that the fractional distortion can be expressed as the square of the object height. The Seidel coefficients show that the distortion depends, at least in part, on the chief ray trace.

The large amount of particular distortion that has to be introduced for a panoramic lens is not natural and requires aspherical components. Using aspherical components also helps to control the lateral color. One particularly difficult aspect of designing an extreme wide angle lenses is the potential for ray tracing failures. Since the aperture stop AS which is a cold shield is at the back of the optical system of the present disclosure and the FOV at the edge of the field is greater than 90 degrees, the software iteration routine should find the appropriate starting point for a chief ray at the front lens to cause it to pass through the center of the aperture stop. However, this can be difficult due to the large amount of entrance pupil aberration common in very wide angle or panoramic lenses. It has been determined that this lens 10 can overcome this difficulty.

Figure 5:
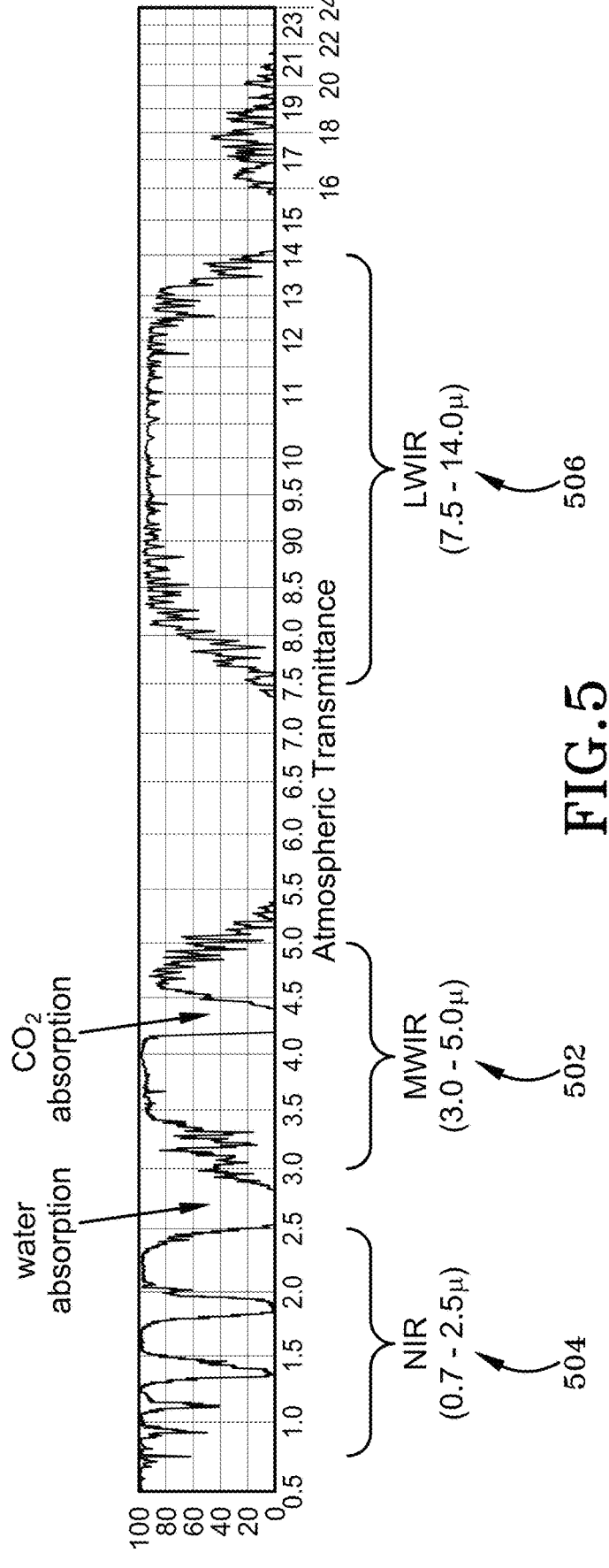
FIG. 5 is a graph depicting atmospheric transmittance curves through the heat spectrum.

FIG. 5 depicts atmospheric transmittance curves through the heat spectrum. MWIR radiation is generated from the heat emitted by the target in length region of 3 μm to 5 μm. The MWIR region is shown at 502 and is located between the Near IR (NIR) region 504 and the long wavelength IR band (LWIR) region 506.

Figure 6:
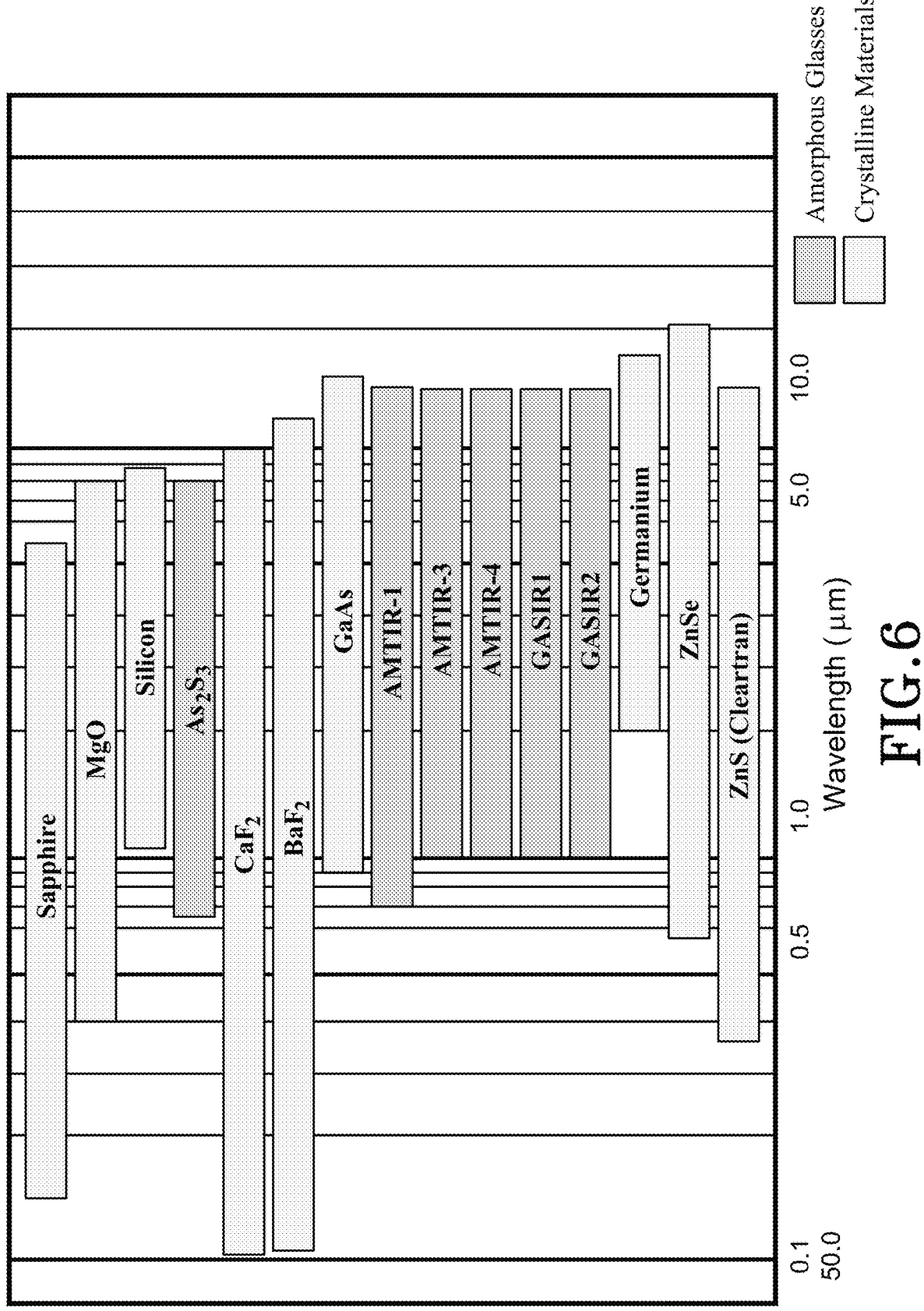
FIG. 6 is a graph depicting transmission ranges for common IR materials.

FIG. 6 is a graph of some non-limiting exemplary choice of optical materials that can be used to form elements 101-109. These materials are depicted as transmitting in MWIR in the form of a transmission range graph for the shown materials. Further, the shown materials are identified as either Amorphous Glass or Crystalline Materials.

FIG. 7 is a table of the materials shown in FIG. 6 that could be utilized to form elements 101-109. It has been determined that there is a limited number of usable materials, inasmuch as most materials do not cover MWIR spectrum. Although the elements 101-109 have been previously described herein as either Silicon or Germanium, other combinations of materials listed in the table of FIG. 7 may suffice depending on the application specific needs of the MWIR lens. Common optical materials/glasses used for MWIR applications include Germanium, Silicon, ZnSe, ZnS, Cleartran, AMTIR, Infrared Chalcogenide glasses, CdTe, CaF₂. The lesser is the number of glasses used the better it is for the production. On the other hand, correction of the chromatic aberration, especially for the wide spectrum, requires more glasses with a certain match of chromatic dispersions. Monochromatic and chromatic aberrations depend on the heights and angles of rays at the optical element surface and refraction index of the material. Aberrations also depend on the shape of the optical element and its location with respect to the aperture stop AS.

Figure 8:
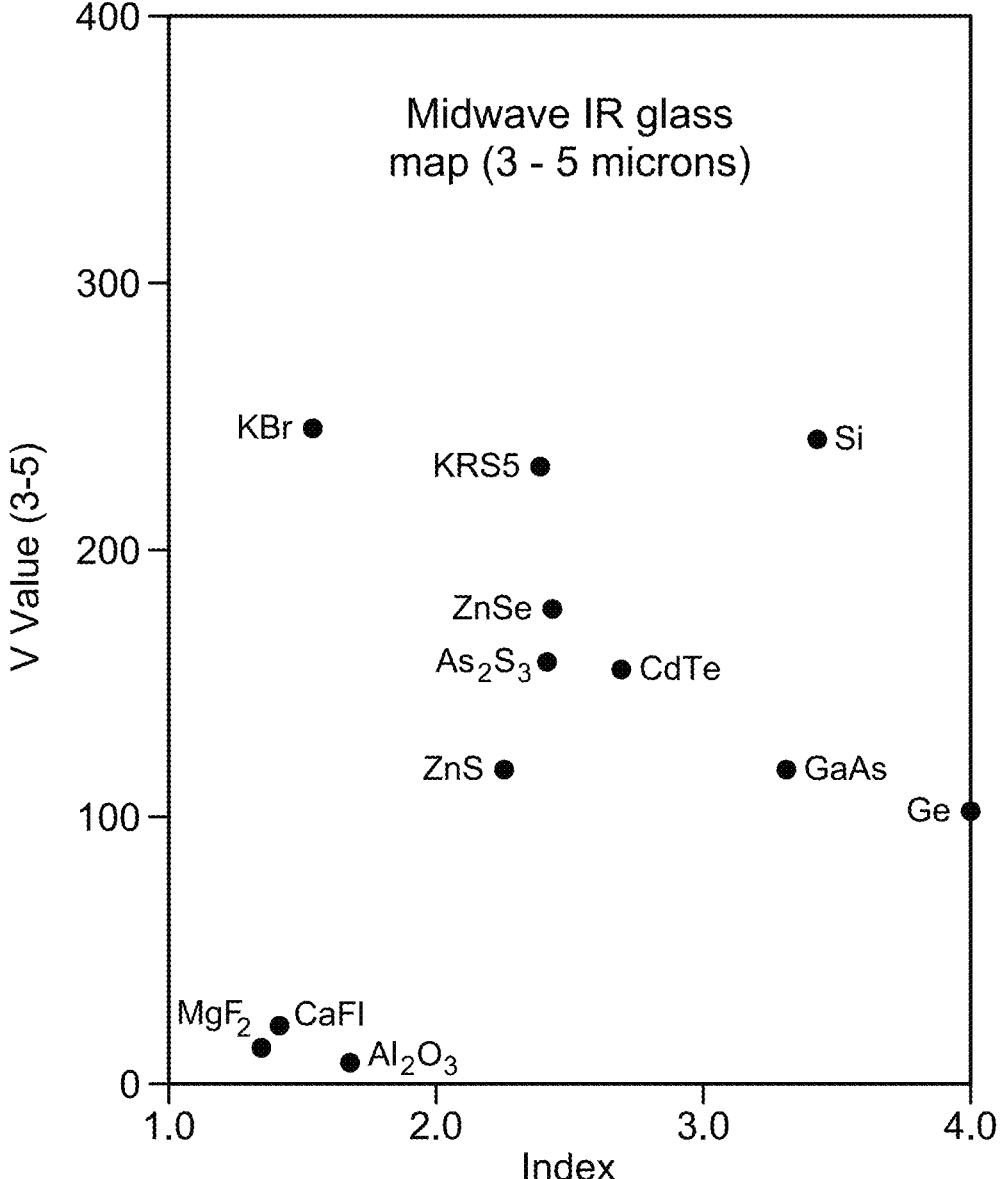
FIG. 8 is a graph detailing MWIR dispersion (V Value) for different materials.

FIG. 8 is a graph depicting the comparison of MWIR dispersion (V Value) for the different materials that can be utilized to form elements 101-109. As shown, the dispersion of Germanium in MWIR region is quite different from dispersion of silicon.

The contribution of the optical element (i.e., each of the elements 101-109) to the total axial color is proportional to the square of axial marginal ray height at the lens, its optical power and it is reciprocal of Abbe number of element material (i.e., the material used to form each of the elements 101-109).

The Abbe number $V_{\lambda2}$ though the definite width of the spectrum is given by:

$$V_{\lambda2} = (n_{\lambda2} - 1) / (n_{\lambda1} - n_{\lambda3}) \qquad \text{(Equation 1)}$$

Where $n_{\lambda2}$ is the index of refraction of the glass at the medium wavelength λ2 of the required spectrum, $n_{\lambda1}$ is the index of refraction at shortest wavelength λ1 of the spectrum and $n_{\lambda3}$ is the index of refraction at the longest wavelength λ3 of the spectrum. The smaller the value of $V_{\lambda2}$, the greater the chromatic dispersion of the glass.

Figure 9:
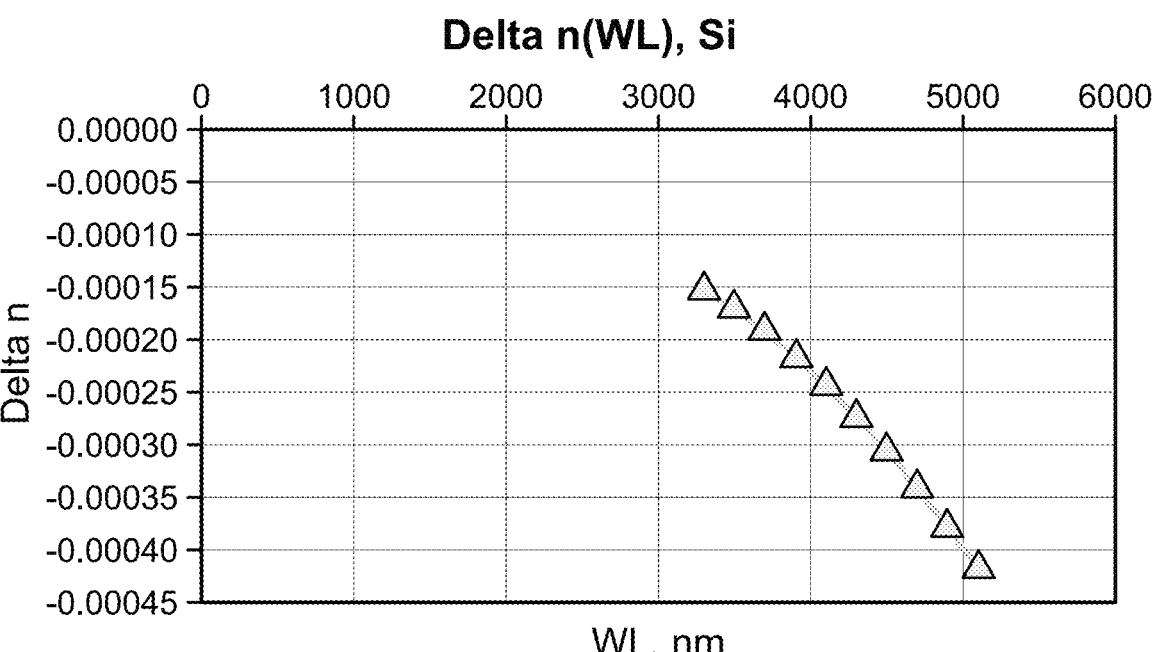
FIG. 9 is a graph depicting the refractive index change across the MWIR spectrum for Germanium.
Figure 10:
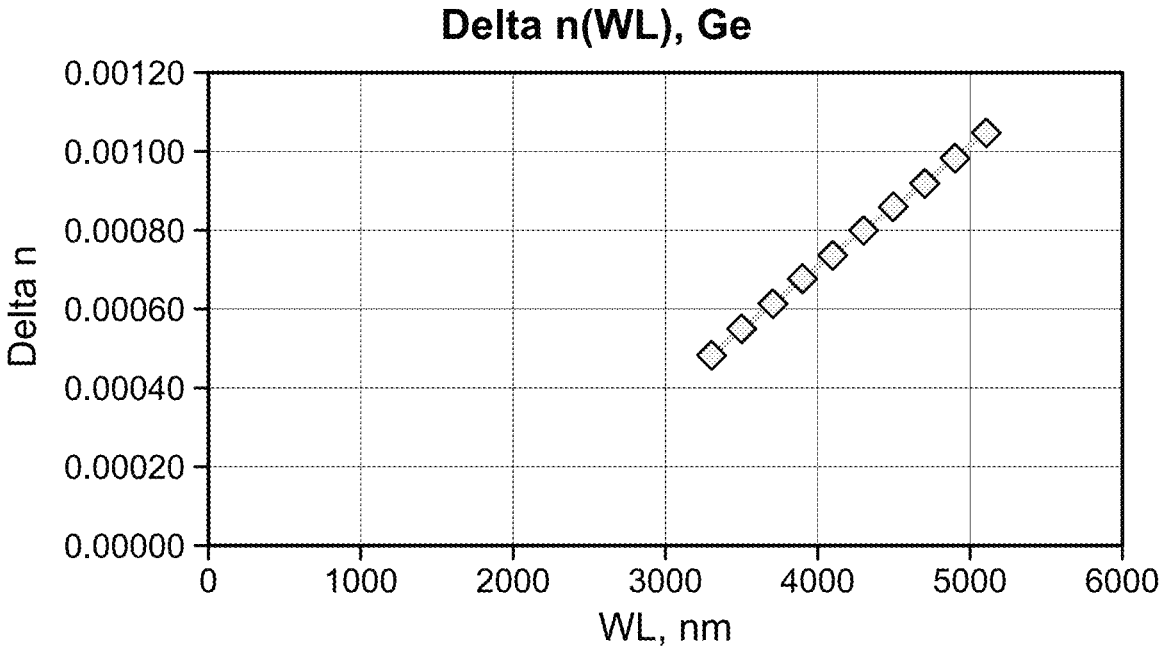
FIG. 10 is a graph depicting the refractive index change across the MWIR spectrum for Silicon.

FIG. 9 and FIG. 10 are graphs of refractive index change across the MWIR spectrum for Silicon and Germanium, respectively. In MWIR spectrum of 3 μm to 5 μm V number (similar to Abbe number for the visible glasses) is defines as $V=(n_{4100\ nm}-1)/(n_{3000\ nm}-n_{5000\ nm})$ and for Germanium is about 140 and for Silicon is about 312. Therefore, Germanium is more dispersive in the MWIR band and may be used as a flint material, while Silicon used as a crown material.

Figure 11:
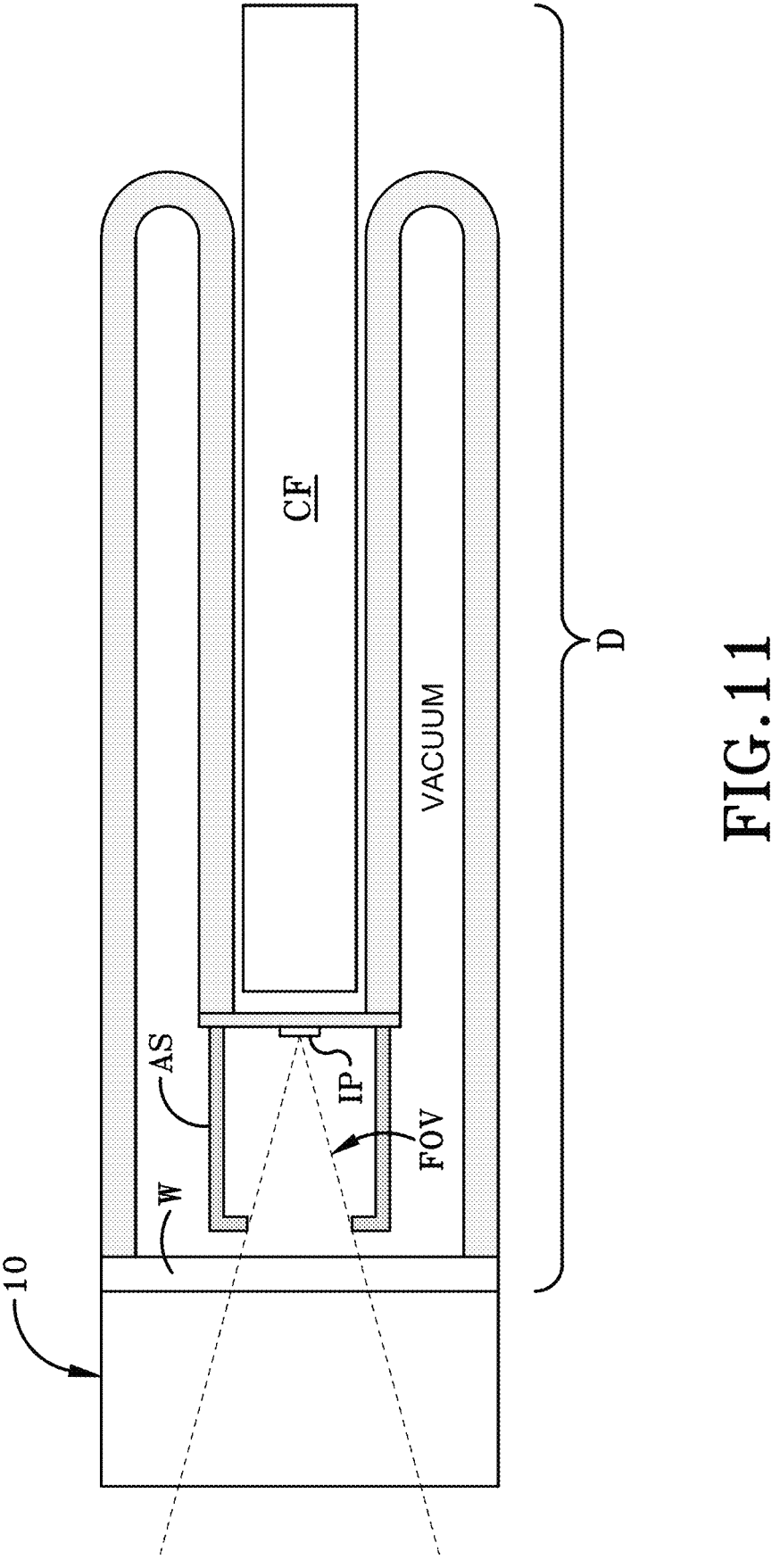
FIG. 11 depicts an exemplary Dewar configuration.

FIG. 11 depicts an exemplary cooled Dewar D detector that is to be utilized with lens 10. Detectors or the image planes IP are typically cooled to 77 K or lower (liquid nitrogen temperatures). To avoid frosting up, the detectors are mounted in a thermally insulated vacuum enclosure (i.e., a Dewar D). Inside the Dewar D, a cold shield or aperture stop AS limits the angle of radiation which can be seen by the detector and eliminates stray radiation/background radiation (100% efficient cold shield). This feature increases the detector sensitivity and improve resolution.

IR systems with cooled detectors, which may be cooled by a cold finger CF, typically have a cold shield in the Dewar D to minimize the background radiation and the size of this cold shield determines the amount of background radiation seen by the detector and hence the system sensitivity. The 100% efficient cold shield AS prevents all background radiation (stray radiation) from achieving the detector.

In general, the total signal received by the detectors is the product of the target spectral emission, the atmospheric transmittance, the optical transmittance, and the detector spectral response:

$$Signal = \int E_{target}(\lambda)_{T_{atmosphere}}(\lambda)_{T_{optics}}(\lambda)R_{detector}(\lambda)d\lambda$$

Yet, there is also the radiometric factors such as target size, solid angles, f/numbers, detector size, etc.

Having thus described the components of the optical system of the present disclosure, reference is now made to how the optical system may be utilized. The optical system of lens 10 for a cooled detector provides an efficient Situational Awareness (SA) day/night sensor to dramatically expand Near-Real-Time (NRT) processing of wide-area, high-resolution video imagery for target recognition and tracking. The optical system can be utilized on moving or stationary platforms, regardless of whether the platform is manned or unmanned, and for either military or civilian application. The optical system having the panoramic MWIR lens 10 for a cooled detector should improve over current approaches that utilize multiple apertures or sensors with limited fields of view at the expense of size, weight and power and cost (SWaP-C). The inclusion of multiple sensors decreases product reliability (higher part counts) and adds both development and support logistics costs. With respect to optical system having the panoramic MWIR lens 10 for a cooled detector identified in the present disclosure, the use of a single 360° imager that can image the full horizon (azimuth) and support greater than 30 degrees of elevation allow for a compact single sensor solution. On-board platform processing to unwrap the 360° image can be accomplished in NRT by utilizing an already developed integrated electronics suite prior to the detection, identification and recognition for targets of interest.

The present disclosure refines and develops a compact 360° Situational Awareness sensor that supports the detection and tracking of objects in the wide field of view and can be accomplished using a single sensor.

In one exemplary embodiment, the sensor or optical system having the panoramic MWIR lens 10 for a cooled detector allows for a single imaging unit and processor to capture data at high frame rates (e.g. greater than 10 Hz) with no seams or overlap artefacts in the image due to the optical design and element layout approach detailed herein. By using MWIR, both day/night imaging is achieved on a single detector and very large formats (e.g. 12k$^2$) are realizable.

The present disclosure provides a MWIR panoramic lens 10 for cooled detectors. Lens 10 features 360 degrees azimuth angle, 40 degrees elevation angle (20 degrees above the horizon and 20 degrees below the horizon), low F #3.3, high resolution of 8 μm detector, cooled Dewar with a 100% efficient cold shield. Image is wrapped in order to precisely match detector dimensions. Lens is deployed in remote sensors mounted on ground or airborne platforms designated for intelligence, surveillance and identification (ISR). Lens allows achieving compactness, lower weigh size, cost and power and cost (SWaP-C) of the sensors. The lens also only utilizes two optical materials, Silicon and Germanium.

According to the one aspect of the present disclosure, a panoramic MWIR lens 10 for cooled detectors includes in order from the object to the image plane nine optical elements, a Dewar D with a cold shield aperture stop AS and cooled high resolution detector or image plane IP. First optical element 101 has negative optical power, second optical element 102 has negative optical power, third optical element 103 has positive optical power, fourth optical element 104 has negative optical power, fifth optical element

105 has negative optical power, sixth optical element 106 has positive optical power, seventh optical element 107 negative optical power, eighth optical element 108 has positive optical power, and ninth optical element 109 has positive optical power. In one particular embodiment, only two materials are utilized: Germanium and Silicon. The powers of the optical elements, their shapes, refractive indices and dispersions of materials are selected such that the lens features a 360 degrees azimuth angle and 40 degrees elevation angle: 20 degrees above and 20 degrees below the horizon. Lens provides high resolution image wrapped to 48 mm×48 mm square, 8 μm resolution detector, which may constitute high resolution CCD or SMOS. Lens in chromatically corrected over the MWIR 3 μm to 5 μm spectrum. In one embodiment, the focal length of the lens 10 is 32.5 mm and F # is 3.3. In one exemplary embodiment, the Dewar length is 152.4 mm overall length of the length is 360 mm.

The optical powers, shapes of the optical elements, optical elements materials refractive indices and dispersions allow cross full field of view monochromatic and chromatic aberrations correction while having 360 degrees azimuth angle and 40 degrees elevation angle from 70 to 110 degrees.

As described herein, aspects of the present disclosure may include one or more electrical, optical or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as welding or the like, or other optically fastening manners or techniques. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A panoramic Mid-Wavelength Infrared (MWIR) lens comprising:

a plurality of optical elements, wherein each optical element from the plurality of elements is formed a material that transmits in at least the MWIR band;

wherein the plurality of optical element are arranged in a manner that provides a 360 degree azimuth angle and an elevation angle that is within +/−20° from a 90° horizon; and wherein the panoramic MWIR lens is configured to be connected to a cooled Dewar, wherein the Dewar includes a cold shield and an image plane to detect light in the MWIR band transmitted through the plurality of optical elements;

wherein the plurality of optical elements comprises:

a first optical element with a negative optical power, wherein the first optical element is formed as a negative meniscus with a convex surface that faces toward an object, and the convex surface of the first optical element is aspherical;

wherein the plurality of optical elements further comprises:

a second optical element with a negative optical power, wherein the second optical element is formed as a negative meniscus with a convex surface faces toward the object and a concave surface that faces away from the object, and the concave surface of the second optical element is aspherical, and wherein the second optical element is located behind the first optical element;

wherein the plurality of optical elements further comprises:

a third optical element with a positive optical power, wherein the third optical element is formed as a positive meniscus with a convex surface faces toward the object and a concave surface that faces away from the object, and the concave surface of the third optical element is aspherical, and wherein the third optical element is located behind the second optical element such that the third optical element receives converged light from the second optical element;

wherein the plurality of optical elements further comprises:

a fourth optical element with a negative optical power, wherein the fourth optical element is formed as a double concave lens with a first concave surface that faces toward the object and a second concave surface that faces toward the image plane, and the second concave surface of the fourth optical element is aspherical, and wherein the fourth optical element is located behind the third optical element; and wherein the plurality of optical elements further comprises:

a fifth optical element with a negative optical power, wherein the fifth optical element is formed as a negative meniscus lens with a concave surface that faces toward the image plane, and the concave surface of the fifth optical element is aspherical, and wherein the fifth optical element is located behind the fourth optical element.

2. The panoramic MWIR lens of claim 1, wherein the plurality of optical elements further comprises:

a sixth optical element with a positive optical power, wherein the sixth optical element is formed as a double convex lens with a first convex surface that faces toward the object and a second convex surface that faces toward the image plane, and the first convex surface of the sixth optical element is aspherical, and wherein the sixth optical element is located behind the fifth optical element.

3. The panoramic MWIR lens of claim 2, wherein the plurality of optical elements further comprises:

a seventh optical element with a negative optical power, wherein the seventh optical element is formed in a form of a negative meniscus lens with a concave surface that faces toward the object, and the concave surface of the seventh optical element is aspherical, and wherein the seventh optical element is located behind the sixth optical element.

4. The panoramic MWIR lens of claim 3, wherein the plurality of optical elements further comprises:

an eighth optical element with a positive optical power, wherein the eighth optical element is formed as a double convex lens with a first convex surface that faces toward the object and a second convex surface that faces toward image plane, and the first convex surface of the eighth optical element is aspherical and wherein the eighth optical element is located behind the seventh optical element.

5. The panoramic MWIR lens of claim 4, wherein the plurality of optical elements further comprises:

a ninth optical element with a positive optical power, wherein the ninth optical element is formed as a positive meniscus lens with a convex surface that faces toward the image plane, and the convex surface of the ninth optical element is aspherical, and wherein the ninth optical element is located behind the eighth optical element and forward of the image plane.

6. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'101 is between −0.48 and −0.36 (−0.48<F'10/F'101<−0.36).

7. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'102 is between −0.65 and −0.4 (−0.65<F'10/F'102<−0.4).

8. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'103 is between 0.3 and 0.45 (0.3<F'10/F'103<0.45).

9. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'104 is between −0.48 and −0.35 (−0.48<F'10/F'104<−0.35).

10. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'105 is between −0.4 and −0.25 (−0.4<F'10/F'105<−0.25).

11. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'106 is between 0.5 and 0.66 (0.5<F'10/F'106<0.66).

12. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'107 is between −0.76 and −0.65 (−0.76<F'10/F'107<−0.65).

13. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'108 is between 0.75 and 0.9 (0.75<F'10/F'108<0.9).

14. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'108 is between 0.75 and 0.9 (0.75<F'10/F'108<0.9).

15. The panoramic MWIR lens of claim 5, further comprising:

an overall focal length (F'10) of the panoramic MWIR lens;

a first focal length (F'101) of the first optical element;

a second focal length (F'102) of the second optical element;

a third focal length (F'103) of the third optical element;

a fourth focal length (F'104) of the fourth optical element;

a fifth focal length (F'105) of the fifth optical element;

a sixth focal length (F'106) of the sixth optical element;

a seventh focal length (F'107) of the seventh optical element;

an eighth focal length (F'108) of the eighth optical element; and a ninth focal length (F'109) of the ninth optical element;

wherein a ratio of F'10/F'109 is between 0.03 and 0.05 (0.03<F'10/F'109<0.05).

16. The panoramic MWIR lens of claim 5, further comprising:

a first refractive index (n101) of the first optical element;

a second refractive index (n102) of the second optical element;

a third refractive index (n103) of the third optical element;

a fourth refractive index (n104) of the fourth optical element;

a fifth refractive index (n105) of the fifth optical element;

a sixth refractive index (n106) of the sixth optical element;

a seventh refractive index (n107) of the seventh optical element;

an eighth refractive index (n108) of the eighth optical element;

a ninth refractive index (n109) of the ninth optical element;

wherein n101/n102 and n101/n104 and n101/n105 and n101/n106 and n101/n108 are proportional and between 1.05 and 1.25 (1.05<n101/n102=n101/n104=n101/n105=n101/n106=n101/n108<1.25).

17. The panoramic MWIR lens of claim 5, further comprising:

a first refractive index (n101) of the first optical element;

a second refractive index (n102) of the second optical element;

a third refractive index (n103) of the third optical element;

a fourth refractive index (n104) of the fourth optical element;

a fifth refractive index (n105) of the fifth optical element;

a sixth refractive index (n106) of the sixth optical element;

a seventh refractive index (n107) of the seventh optical element;

an eighth refractive index (n108) of the eighth optical element;

a ninth refractive index (n109) of the ninth optical element;

wherein n101/n103 and n101/n107 and n101/n109 are proportional and between 0.95 and 1.05 (0.95<n101/n103=n101/n107=n101/n109<1.05).

18. The panoramic MWIR lens of claim 5, further comprising:

a first Abbe number (V101) of the first optical element;

a second Abbe number (V102) of the second optical element;

a third Abbe number (V103) of the third optical element;

a fourth Abbe number (V104) of the fourth optical element;

a fifth Abbe number (V105) of the fifth optical element;

a sixth Abbe number (V106) of the sixth optical element;

a seventh Abbe number (V107) of the seventh optical element;

an eighth Abbe number (V108) of the eighth optical element;

a ninth Abbe number (V109) of the ninth optical element;

wherein V101/V102 and V101/V104 and V101/V105 and V101/V106 and V101/V108 are proportional and between 0.35 and 0.5 (0.35<V101/V102=V101/V104=V101/V105=V101/V106=V101/V108<0.50).

19. The panoramic MWIR lens of claim 5, further comprising:

a first Abbe number (V101) of the first optical element;

a second Abbe number (V102) of the second optical element;

a third Abbe number (V103) of the third optical element;

a fourth Abbe number (V104) of the fourth optical element;

a fifth Abbe number (V105) of the fifth optical element;

a sixth Abbe number (V106) of the sixth optical element;

a seventh Abbe number (V107) of the seventh optical element;

an eighth Abbe number (V108) of the eighth optical element;

a ninth Abbe number (V109) of the ninth optical element;

wherein V101/V103 and V101/V107 and V101/V109 are proportional and between 0.9 and 1.10 (0.90<V101/V103=V101/V107=V101/V109<1.10).

20. The panoramic MWIR lens of claim 1, further comprising:

an overall length (OAL) of the panoramic MWIR lens;

a length (DL) of the cooled Dewar;

wherein a ratio of OAL/DL is between 2.55 and 2.85 (2.55<OAL/DL<2.85).

21. The panoramic MWIR lens of claim 1, further comprising:

an F-number that is less than or equal to 3.3.

22. The panoramic MWIR lens of claim 1, wherein the plurality of optical elements are formed from either Silicon or Germanium.

* * * * *